United States Patent
Chupp

(10) Patent No.: US 10,099,658 B1
(45) Date of Patent: Oct. 16, 2018

(54) COLD WEATHER LIGHT ASSEMBLIES

(71) Applicant: Thomas Samuel Chupp, Marcellus, MI (US)

(72) Inventor: Thomas Samuel Chupp, Marcellus, MI (US)

( * ) Notice: Subject to any disclaimer, the term of this patent is extended or adjusted under 35 U.S.C. 154(b) by 0 days.

(21) Appl. No.: 15/689,215

(22) Filed: Aug. 29, 2017

Related U.S. Application Data

(60) Provisional application No. 62/382,801, filed on Sep. 2, 2016.

(51) Int. Cl.
*B60S 1/52* (2006.01)
*B60S 1/60* (2006.01)
*B60Q 1/00* (2006.01)

(52) U.S. Cl.
CPC ............ *B60S 1/603* (2013.01); *B60Q 1/0017* (2013.01); *B60S 1/52* (2013.01); *B60S 1/528* (2013.01)

(58) Field of Classification Search
CPC .. B06S 1/52; B06S 1/528; B06S 1/602; B06S 1/66; B06S 1/663; B60Q 1/0017
USPC .................................. 239/284.2; 15/250.002
See application file for complete search history.

(56) References Cited

U.S. PATENT DOCUMENTS

| | | | | |
|---|---|---|---|---|
| 3,939,523 A * | 2/1976 | Kolbe | ..................... | B60S 1/603 15/250.02 |
| 4,088,358 A * | 5/1978 | Hirsch | ..................... | B60S 1/603 239/284.2 |
| 4,285,470 A * | 8/1981 | Roth | ..................... | B60Q 1/0017 15/250.002 |
| 4,368,505 A * | 1/1983 | Tomforde | ............ | B60Q 1/0017 239/284.2 |
| 6,074,078 A * | 6/2000 | Georgeff | ................ | B60Q 1/302 222/113 |
| 6,158,671 A * | 12/2000 | Kodaira | .................. | B60S 1/486 239/284.2 |
| 6,398,130 B2 * | 6/2002 | Pfalzgraf | ............. | B60Q 1/0017 239/284.2 |
| 6,601,983 B1 * | 8/2003 | Runfola | .................. | B60S 1/026 362/545 |

* cited by examiner

*Primary Examiner* — Alexander Valvis

(57) ABSTRACT

A light assembly for use in cold and/or inclement weather. The light assembly includes a lens having a hood wherein the hood is formed as a one piece formation with the lens. The hood and/or lens includes at least one aperture in communication with a supply of fluid. The supply of fluid being a windshield washing fluid (or similar) configured to melt and ice and/or snow on the lens of the light assembly.

8 Claims, 5 Drawing Sheets

COLD WEATHER LIGHT ASSEMBLIES

TECHNICAL FIELD

The present specification generally relates to lights. More specifically, the present specification relates to vehicle light assemblies having means for removing snow and ice.

BACKGROUND

The integration of light emitting diodes (LEDs) in lamp assemblies are well known in the art. LED lamp assemblies for use on motor vehicles are also well known in the art. LED lamp assemblies have advantages over incandescent bulbs, LED lamp assemblies have much longer lives, so their utility is longer, more reliable, and more cost efficient.

One drawback has been snow and Ice building up on the lens while many attempts have been made to relieve such problems.

REFERENCING US PATENT DOCUMENTS

U.S. Pat. No. 3,939,523 February 1976 Kolbe et al.
U.S. Pat. No. 4,088,358 May 1978 Hirsch
U.S. Pat. No. 4,285,470 August 1981 Roth
U.S. Pat. No. 6,074,078 June 2000 Georgeff et al.

All the Patents referenced may have done well to achieve their goals many have more parts and seals and would seem to need more fluid to achieve their primary goals of clearing windshield and light assemblies.

Accordingly, a need exists for alternative light assembly providing for removal of snow and ice from the lens of a light assembly.

SUMMARY

There still remains a need for a light assembly with lens clearing ability in the art. A light assembly for use in cold and/or inclement weather. The light assembly to direct fluid to its lens includes a lens having a hood wherein the hood is formed as a one piece formation with the lens. The hood and/or lens includes at least one aperture in communication with a supply of fluid. The supply of fluid being a windshield washing fluid (or similar) configured to melt ice and/or snow on the lens of the light assembly.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
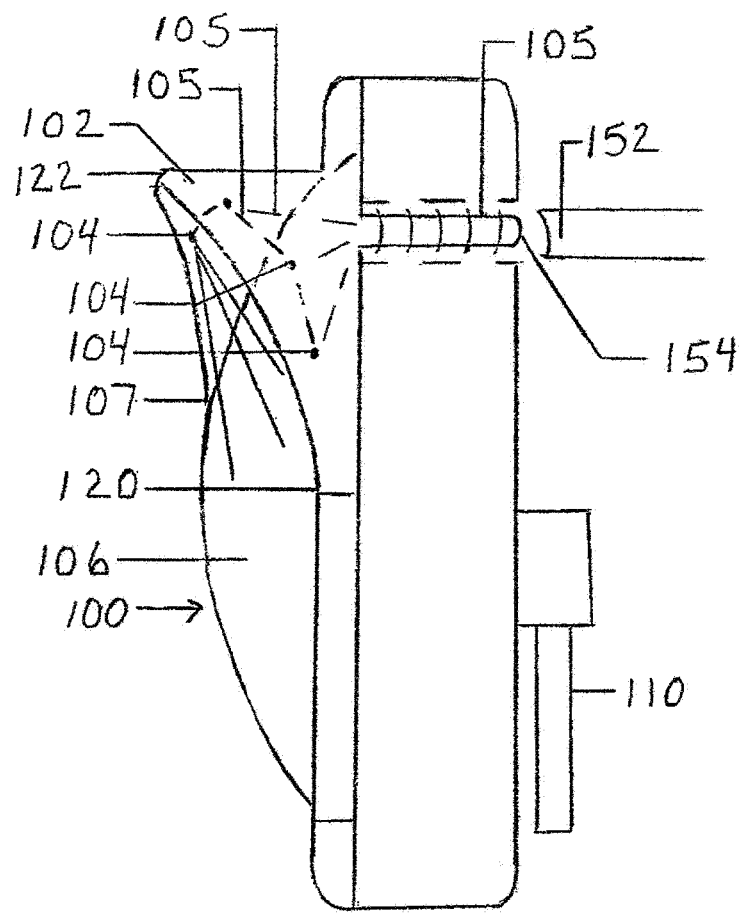
FIG. 1 depicts a first embodiment drawing side view of the light assembly according to one or more embodiments shown and described herein.

FIG. 1 generally depicts a light assembly for use in cold and/or inclement weather. The light assembly includes a lens having a hood wherein the hood is formed as a one piece formation with the lens. The hood and/or lens includes at least one aperture in communication with a supply of fluid. The supply of fluid being a windshield washing fluid (or similar) configured to melt and ice and/or snow on the lens of the light assembly.

Several different embodiments are shown and described herein. Most embodiment feature at least one aperture formed into the lens body of the light assembly, typically through a hood or similar overhand. The light assembly is configured to be used on the rear of a truck and/or trailer during inclement weather but can be used as all season wherein the cold weather feature may be turned off when not needed.

Figure 2:
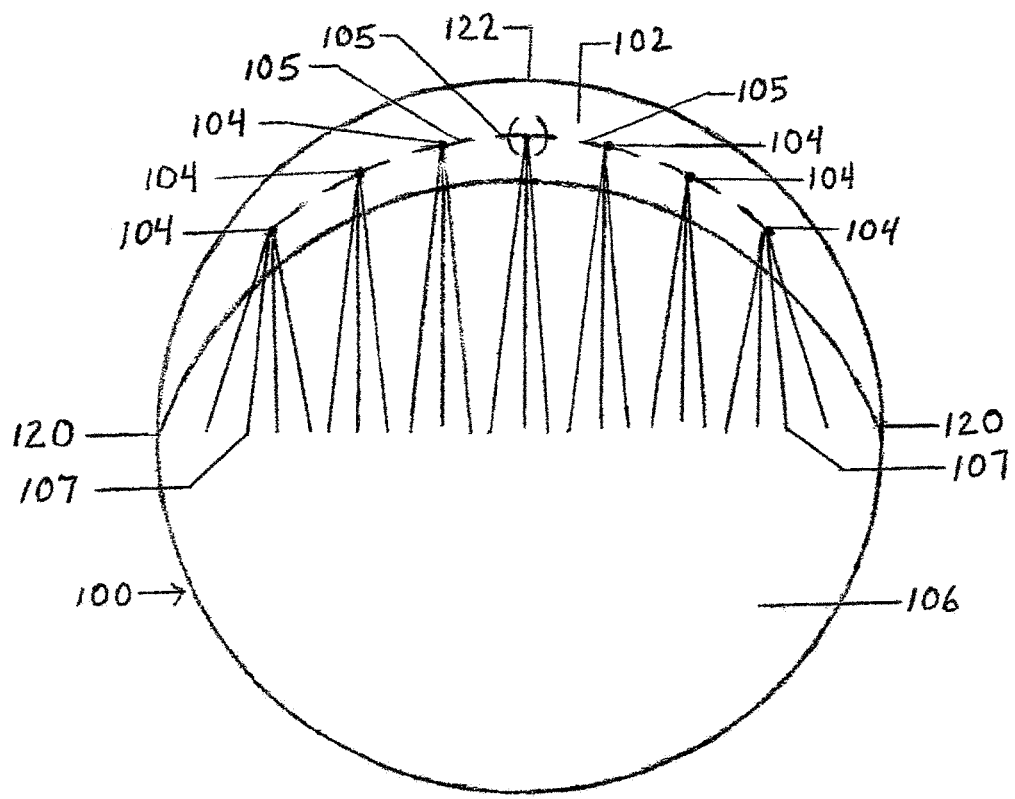
FIG. 2 depicts a first embodiment drawing frontal view of the light assembly according to one or more embodiments shown and described herein.

Referring now to FIGS. 1-2 illustrating a first embodiment, the light assembly 100 includes a hood intricately formed with a lens 106. The hood 102 is formed together with the lens 106 as a one piece formation. In some embodiments, the hood 102 and the lens 106 are formed as a molding process in a one piece configuration. The hood 102 includes a plurality of holes or apertures 104. The apertures 104 are connected by means of an inner tubing system 105. The inner tubing system 105 connects to a fluid supply. The fluid supply is configured to provide a supply of windshield washer fluid. The windshield washer fluid is configured to be pumped through the apertures 104 and the piping 105 so as to spray fluid onto the outer surface 107 of the lens 106. As fluid is sprayed onto the outer surface 107 of the lens 106, any snow and/or ice is then melted from the outer surface 107 thereby improving visibility.

The light assembly 100 is configured to be replaceable with any standard taillight on a commercial truck or trailer. A connection of the wires 110 allows for replacement and use of the light assembly 100 a tubing port 154 is configured to accept a tubing 152.

In the present embodiment, the hood 102 is intricately formed with the lens 106 to form a one piece component. The hood includes a center portion 122 and outer edges 120 where the outer edges 120 generally taper towards the outer surface 107 of the lens 106.

In the present embodiment, a plurality of apertures 104 are provided. In the present embodiment, seven apertures 104 are provided. This disclosure is not intended to limit the number of apertures and may range from one aperture to an infinite number of apertures position at the top and around the lens 106.

Figure 3:
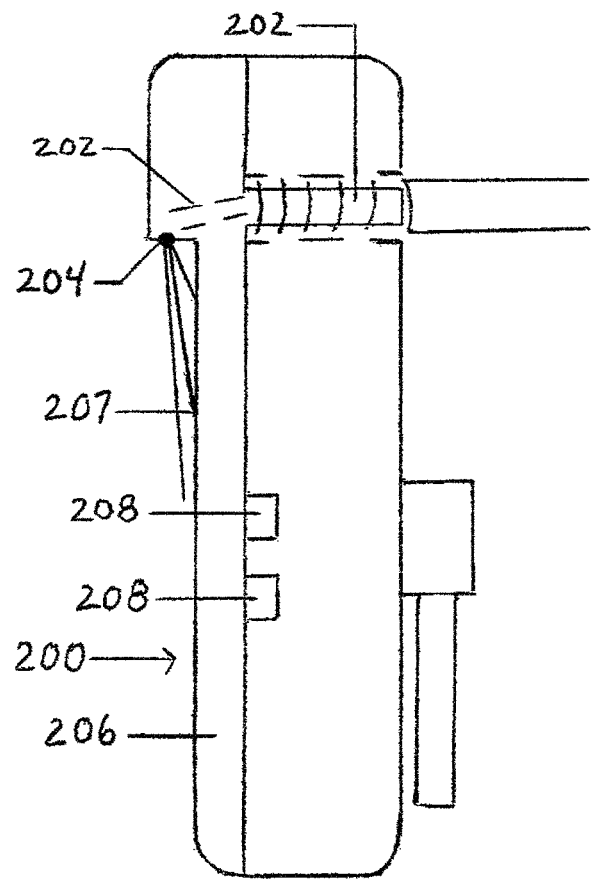
FIG. 3 depicts a second embodiment drawing side perspective view of the light assembly according to one or more embodiments shown and described herein.
Figure 4:
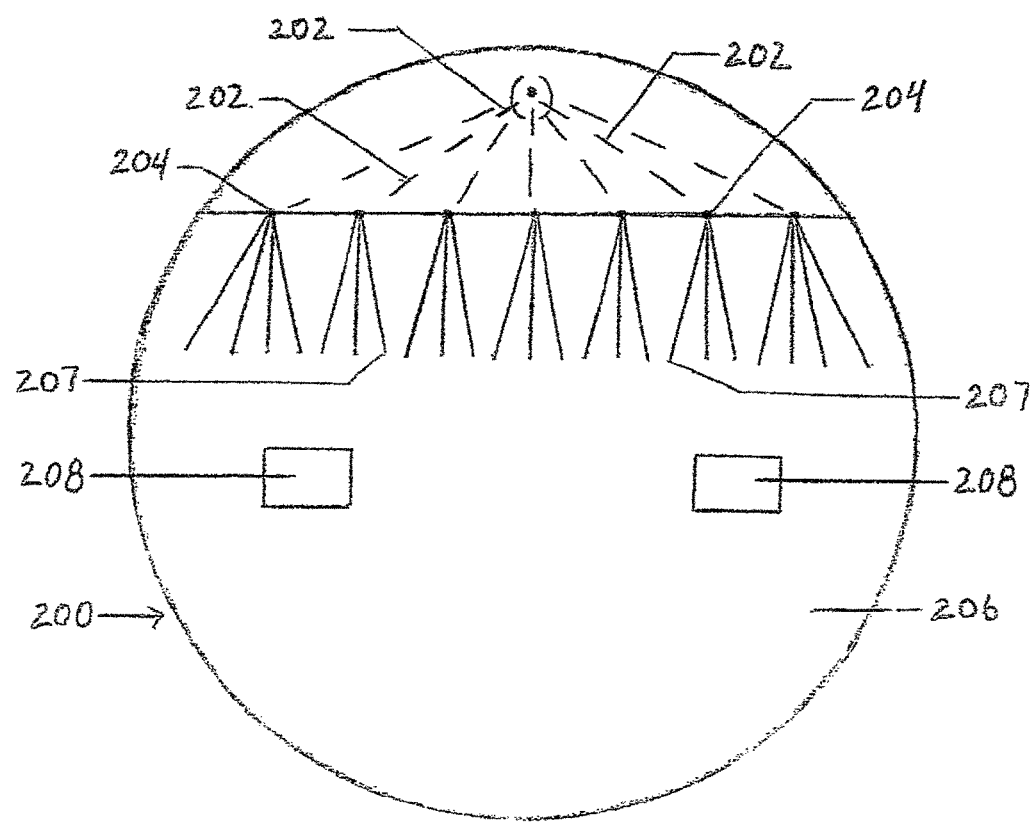
FIG. 4 depicts a second embodiment drawing frontal view of the light assembly according, to one or more embodiments shown and described herein.

A second embodiment of the present specification is illustrated in FIGS. 3-4. A light assembly 200 is configured having a sprayer portion 202 intricately formed with a lens 206. The lens 206 is configured to cover a plurality of light emitting diodes (LEDs) 208. The sprayer portion 202 includes a plurality of apertures 204 configured to direct the fluid onto the outer surface 207 of the lens 206. The apertures 204 are in fluid communication with a tank and pumping system configured to direct fluid from the tank through the apertures 204 thereby spraying the fluid onto the surface 207 of the lens 206.

Figure 5:
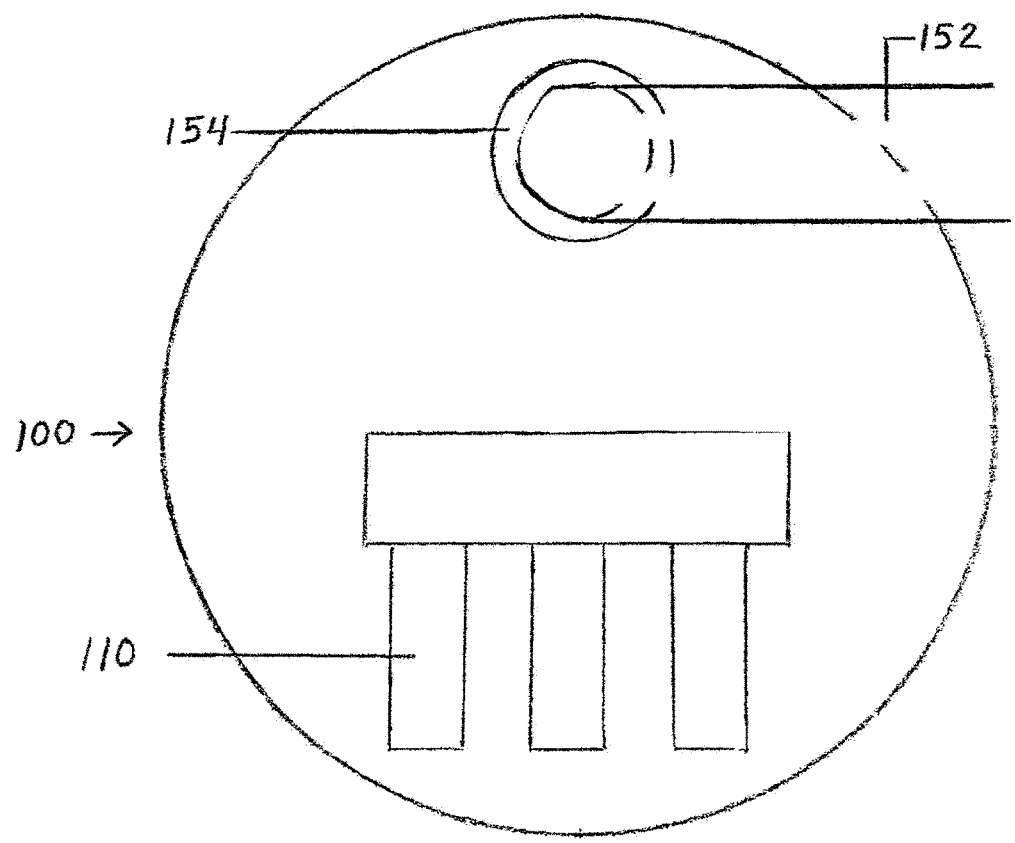
FIG. 5 depicts a drawing rear view of the of the light assembly according to one or more embodiments shown and described herein.

Illustrated in FIG. 5 is Rear View of Light Assembly 100

The apertures 104, 204 are all configured to direct fluid onto the outer Surface of the lens. The apertures may be angled and dimensioned so as to spray and/or otherwise direct fluid directly onto the surface of the lens. The fluid then melts and/or otherwise washes away any debris, snow and/or ice from the outer surface. The fluid is not directed towards a windshield or other vehicle component.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A lighting assembly for a vehicle comprising:
   at least one light emitting diode connected to wires;
   a lens having an outer surface covering the at least one light emitting diode;
   a supply of fluid;
   a hood formed as a one piece formation with the lens, protruding from the outer surface of the lens, the hood including a plurality of apertures each formed on an arc on a center portion of a bottom surface of the hood angled to direct the supply of fluid vertically downward onto the outer surface of the lens, the hood further includes front outer edges which taper to the outer surface of the lens;
   an inner tubing system having tubing which connects the plurality of apertures via a tubing port of the lens to the supply of fluid;
   wherein the plurality of apertures have substantially the same angle relative to a vertical axis of the lens; and
   wherein the supply of fluid is pumped through the inner tubing system and the plurality of apertures of the hood to spray fluid directly onto the outer surface of the lens.

2. The lighting assembly of claim 1, wherein:
said supply of fluid is a supply of windshield washer fluid.

3. The lighting assembly of claim 1, wherein:
the fluid is not directed towards the windshield.

4. The lighting assembly of claim 1, wherein:
the fluid is configured to melt snow or ice on the lens.

5. The lighting assembly of claim 1, wherein:
the fluid is configured to remove debris on the lens.

6. The lighting assembly of claim 1, wherein:
the tubing port is on a back of the lens.

7. The lighting assembly of claim 1, wherein:
the wires are on the back of the lens.

8. The lighting assembly of claim 1, wherein:
the lighting assembly is configured to be replaceable with a taillight of the vehicle via the wires.

\* \* \* \* \*